United States Patent Office 3,424,723
Patented Jan. 28, 1969

3,424,723
2,6-DIHALOBENZTHIOHYDRAZIDES
John Yates and Ernest Haddock, Kent, England, assignors to Shell Oil Company, New York, N.Y., a corporation of Delaware
No Drawing. Filed June 10, 1966, Ser. No. 556,548
Claims priority, application Great Britain, June 17, 1965, 25,686/65
U.S. Cl. 260—551     3 Claims
Int. Cl. A01n 9/12; C07c 153/01, 153/05

ABSTRACT OF THE DISCLOSURE 2,6-dihalobenzothiohydrazides wherein the thiol may be substituted with hydrogen or lower alkyl, and the hydrazide may be substituted with lower alkyl, cycloalkyl or aryl; or the hydrazide may form certain heterocyclic systems and mineral acid salts thereof, useful as herbicides.

This invention relates to novel dihalobenzothiohydrazides. In particular, this invention relates to novel dichlorobenzothiohydrazides having superior effectiveness as pesticides.

With the increasing economic importance of agriculture, the need for methods of suppressing unwanted vegetation has correspondingly increased. The presence of weeds and grasses in areas devoted to crops is undesirable because the former types of plants compete with the crops for water and for soil nutrients. Moreover, such weeds and grasses interfere with the care and harvesting of the crops. For these reasons, methods of controlling unwanted vegetation have received considerable attention in recent years. In particular, it is desirable to provide chemical pesticides which will effectively suppress unwanted vegetation without affecting the growth of the crop plant.

One particularly useful type of chemical pesticide that has been found for this purpose is the class of compounds exemplified by 2,6-dichlorobenzonitrile and its derivatives. Such materials are described in the following U.S. patents: Koopman et al., U.S. 3,027,248; Koopman et al., U.S. 3,179,691; Koopman, U.S. 3,185,725; Koopman, U.S. 3,165,392; Netherlands application No. 6,410,300. Since many of the compounds described in such references lack optimal features for a successful commercial herbicide, studies of alternative compounds have continued.

It is an object of the present invention to afford a novel class of 2,6-dihalobenzothiohydrazides. Another object of the invention is the provision of such a class of compounds having useful biological properties. Another object is the provision of effective herbicides comprising such 2,6-dihalobenzothiohydrazides. Provision of a method of controlling unwanted vegetation with such compounds is still another object of the invention. Other objects will be apparent from the following detailed description of the invention.

These objects are accomplished by the 2,6-dihalobenzothiohydrazide of the structure

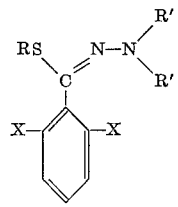

wherein each X is halogen; R is hydrogen or alkyl of 1–4 carbon atoms; and R' is a monovalent radical selected from the group consisting of hydrogen; alkyl of 1–4 carbon atoms; cycloalkyl of 5–6 carbon atoms; and aryl of 6–10 carbon atoms; or both R's on one nitrogen atom taken together form a heterocyclic system having a total of from 5 to 7 members, and wherein one ring member is selected from the group consisting of carbon, oxygen and nitrogen; as well as the mineral acid salts thereof.

The compounds of the invention may exist in either of two tautomeric forms, as set forth below

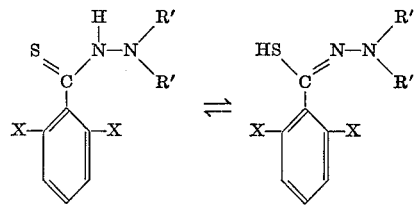

wherein X and R' have the above significance. Many of them exist principally in the thiol form.

The compounds of the invention may be substituted in the ortho positions of the phenyl ring with such halogens as bromine, iodine, or chlorine; exemplary compounds include 1 - (2,6-diiodothiobenzoyl)-2,2-dimethylhydrazine; 1 - (2,6 - dibromothiobenzoyl)-2,2-diethylhydrazine; or 1 - (2 - bromo-6-chlorothiobenzoyl)-2,2-diethylhydrazine. Most effective as herbicides of these compounds, however, are those wherein each X is chlorine, and the invention will be described in terms of such dichloro compounds.

The simplest dichloro hydrazide of the invention is that wherein both R's are hydrogen; that compound is 1-(2,6-dichlorothiobenzoyl)-hydrazine. However, equally effective as herbicides are dichloro hydrazides wherein each R may be hydrogen or alkyl, preferably of 1–4 carbon atoms. Representative of such compounds are 1-(2,6-dichlorothiobenzoyl)-2,2-dimethyl hydrazine
1-(2,6-dichlorothiobenzoyl)-2,2-diethyl hydrazine
1-(2,6-dichlorothiobenzoyl)-2,2-dipropyl hydrazine
1-(2,6-dichlorothiobenzoyl)-2,2-dibutyl hydrazine
1-(2,6-dichlorothiobenzoyl)-2-methyl-2-ethyl hydrazine
1-(2,6-dichlorothiobenzoyl)-2-n-butyl-2-methyl hydrazine
1-(2,6-dichlorothiobenzoyl)-2-isopropyl hydrazine.

Other examples of such compounds will be apparent to one skilled in the art.

Another useful class of dichloro hydrazines is that wherein either or both R's may be cycloalkyl, preferably having a ring of 5–6 carbon atoms. Exemplary cycloalkyl compounds are 1 - (2,6-dichlorothiobenzoyl)-2,2-di(cyclopentyl hydrazine
1 - (2,6 - dichlorothiobenzoyl)-2,2-di(cyclohexyl hydrazine
1 - (2,6 - dichlorothiobenzoyl) - 2-cyclopentyl-2-cyclohexyl-hydrazine
1 - (2,6 - dichlorothiobenzoyl)-2-cyclohexyl hydrazine and the like.

When R may be aryl, typical hydrazides are 1-(2,6-dichlorothiobenzoyl)-2,2-diphenyl hydrazine
1-(2,6-dichlorothiobenzoyl)-2,2-dibenzyl hydrazine
1-(2,6-dichlorothiobenzoyl)-2,2-ditolyl hydrazine
1-(2,6-dichlorothiobenzoyl)-2,2-dinaphthyl hydrazine
1-(2,6-dichlorothiobenzoyl)-2-phenyl hydrazine and the like. Preferred aryl substitutents are those having up to 10 carbon atoms.

As pointed out above, one of nitrogen atoms of the invention may be included as one member of a heterocyclic radical having a total of from 5 to 7 members. In such a case, the R's together form a divalent radical of 4–6 members. Such a molecule has the structure

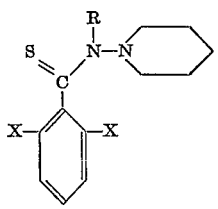

when the hetero ring has six members of which 5 are carbon atoms. The heterocyclic radical may, however, include one other hetero atom selected from oxygen and nitrogen; most conveniently, the hetero ring is saturated.

Representative of such compounds are 1-(2,6-dichlorothiobenzamido) piperidine
1-(2,6-dichlorothiobenzamido) pyrrolidine
1-(2,6-dichlorothiobenzamido) morpholine
1-(2,6-dichlorothiobenzamido) hexamethyleneimine
N-(4-methylpiperazin-1-yl)-2,6-dichlorothiobenzamide and the like.

Equally effective as herbicides are the mineral acid salts of the noted hydrazides. Such salts are preferably those of the hydrogen halides. Exemplary salts include 1-(2,6-dichlorothiobenzoyl)-2,2-dimethylhydrazine hydrochloride
1-(2,6-dichlorothiobenzoyl)-2,2-dimethylhydrazine hydrobromide
1-(2,6-dichlorothiobenzoyl)-2,2-dimethylhydrazine methiodide
1-(2,6-dichlorothiobenzamido) piperidine hydrobromide
1-(2,6-dichlorothiobenzamido) piperidine hydrochloride
1-(2,6-dichlorothiobenzamido) piperidine hydroiodide
N-(2,6-dichlorothiobenzamido) hexamethyleneimine hydrochloride
N-(4-methylpiperazin-1-yl)-2,6-dichlorothiobenzamide hydrochloride
N-(4-methylpiperazin-1-yl)-2,6-dichlorothiobenzamide hydrobromide
S-methyl-2,6-dichloro-N-dimethylaminothiobenzimidate hydroiodide and the like.

The novel dihalo hydrazides of the invention are readily prepared by the methods of the chemical art. They may be prepared, for example, by reacting 2,6-dihalobenzoyl chloride with an appropriate hydrazine, and treating the resulting product with phosphorus pentasulfide. Thus, 1-(2,6-dichlorobenzoyl)-2,2-dimethyl hydrazine is obtained by reacting 1,1-dimethyl hydrazine with 2,6-dichlorobenzoyl chloride. The substituted hydrazine intermediate is then reacted with phosphorus pentasulfide to afford 1-(2,6-dichlorothiobenzoyl)-2,2-dimethyl hydrazine.

The salts of the 2,6-dihalobenzthiohydrazides are readily prepared by reacting the hydrazides with a mineral acid such as a hydrogen halide. For example, when 1-(2,6-dichlorothiobenzoyl)-2,2-dimethylhydrazine is reacted with hydrogen chloride, the product is 1-(2,6-dichlorothiobenzoyl)-2,2-dimethylhydrazine hydrochloride. Other acids which may be employed include sulfuric acid, nitric acid and the like, affording such salts as sulfates and nitrates.

Similarly, the hydrazides may be reacted with a base or an alkylating agent to afford other types of derivatives. For example, when 1-(2,6-dichlorothiobenzoyl)-2,2-dimethylhydrazine is reacted with methyl iodide, the product S-methyl-2,6-dichloro-N-dimethylaminethiobenzimidate hydroiodide is obtained. This salt may then be reacted with a base such as sodium bicarbonate to afford the parent S-methyl-2,6-N-dimethylaminothiobenzimidate.

Such reaction may be carried out in the absence of a reaction medium. They are, however, most conveniently conducted in liquid phase dissolved in an inert solvent, such as ether, benzene, toluene, xylene, acetone, chloroform and the like. Only moderate conditions of temperature are required to bring about the reactions, which readily take place at atmospheric pressure. The desired products are readily separated from the reaction system by such conventional methods as crystallization, extraction, evaporation, etc.

The compounds so produced are active as pre-emergence herbicides. They are useful for controlling unwanted vegetation, such as weeds and grasses, by applying them to the locus of such vegetation, for example, to the soil in which the seeds of those weeds and grasses are mixed. The compound is added in herbicidal amount, that is, an amount sufficient to inhibit the growth of the undesirable vegetation. In general, such amounts will range from less than 1 pound per acre up to about ten pounds per acre, depending both on the nature of the herbicide and on the field conditions.

Most conveniently, the herbicidal hydrazides of the invention are applied to such locii in admixture with an inert horticultural adjuvant, e.g. a carrier, diluent, or the like. Amounts of the active herbicidal hydrazide in such compositions will be governed by the compatability of the hydrazide and the diluent, the activity of the hydrazide, and the field conditions. Only a herbicidal amount of the hydrazide will be required for such compositions. In general, however, amounts of the hydrazide from about 0.1% w. to about 95% w. of the herbicidal composition may be employed. Preferred compositions are those comprising an inert horticultural adjuvant and 1% w.–50% w. of the hydrazide of the invention.

The herbicidal compositions of the invention may also contain a surface active agent. The invention also includes thereof, a herbicidal composition which comprises a compound of the invention and a carrier, or a surface active agent, or both a carrier and a surface active agent.

The carrier may be a solid, a liquid or a compressed gas. Examples of solid carriers are clays, silicates, synthetic hydrated silicon oxides, resins, waxes, synthetic polymeric materials, carbon and sulfur. Examples of liquid carriers are water, alcohols, ketones, aromatic hydrocarbons, chlorinated hydrocarbons and suitable petroleum fractions. Examples of compressed gases are those normally applied in insecticidal aerosols, e.g. trichloromonofluoromethane or dichlorodifluoromethane.

The surface active agent may be anionic, cationic or nonionic and may take the form of an emulsifier, wetting agent, dispersing agent or a sticker. Examples of suitable surface active agents are alkyl aryl sulfones, alkyl sulfates containing not more than 10 carbon atoms, alkyl phenol/ethylene oxide condensates, sorbitan esters of fatty acids, alkyl amide sulfonates and ethylene oxide/fatty acid ester condensates.

The compositions of the invention may be formulated as a wettable powder, a dust, granules, a concentrate, a solution, an emulsifiable concentrate, a conventional emulsion, an invert emulsion, an aerosol or an encapsulated material.

To illustrate the compounds and formulations of the invention and their uses, the following examples are given. It should be understood, however, that the examples are illustrative only; and are not to be regarded as limitations to the appended claims since the basic teachings of the invention may be varied at will, as will be understood by one skilled in the art. In the examples, the proportions are set forth either in parts by weight (w.) or parts by volume (v.), such proportions bearing the same relation as the kilogram to the liter.

Example I.—Preparation of 1-(2,6-dichlorothiobenzoyl)-2,2-dimethylhydrazine

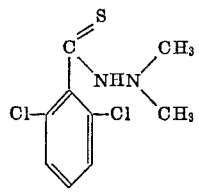

(a) 2,6-dichlorobenzoyl chloride (21 w.) and 1,1-dimethylhydrazine were stirred together in ether solution (300 v.) for 7 hours. The solid product which had gradually settled out was filtered off and washed, first with hot water and second with ether. The reaction yielded 16 w. of the novel compound 1-(2,6-dichlorobenzoyl)-2,2-dimethylhydrazine which had a melting point of 190°–192° C.

*Analysis.*—Calculated for $C_9H_{10}N_2OCl_2$: C, 46.3; H, 4.3; S, 12.9; Cl, 28.5%. Found: C, 46.2; H, 4.4; S, 12.8; Cl, 28.5%.

(b) 1-(2,6 - dichlorobenzoyl)-2,2 - dimethylhydrazine (5 w.) and phosphorus pentasulfide (5 w.) were refluxed in toluene solution (100 v.) overnight. The solvent was then decanted off and evaporated down until pale yellow crystals of 1-(2,6-dichlorothiobenzoyl) - 2,2-dimethylhydrazine separated. These were purified by refluxing with petroleum spirit, filtering and drying. The reaction yielded 1.3 w. of product having a melting point of 166–168° C.

*Analysis.*—Calculated for $C_9H_{10}N_2SCl_2$: C, 43.4; H, 4.0; S, 12.9; Cl, 28.5%. Found: C, 43.2; H, 4.1; S, 12.8; Cl, 28.5%.

Example II.—Preparation of 1-((2,6-dichlorothiobenzoyl)-2,2-dimethylhydrazine hydrochloride This compound was prepared by passing dry hydrogen chloride gas into an ethereal solution of 1-(2,6-dichlorothiobenzoyl) - 2,2 - dimethylhydrazine until precipitation was complete. The reaction gave a product having a melting point of 175–176° C.

*Analysis.*—Calculated for $C_9H_{11}N_2SCl_3$: C, 37.8; H, 3.8; S, 11.2; Cl, 37.3%. Found: C, 37.9; H, 4.0; S, 11.3; Cl, 37.2%.

Example III.—Preparation of 1-(2,6-dichlorothiobenzamido)-piperidine

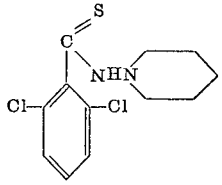

(a) A mixture of 2,6-dichlorobenzoyl chloride (21 w.) and N-aminopiperidine (12 w.) was shaken with aqueous potassium carbonate until reaction was complete. The novel compound 1-(2,6 - dichlorobenzamido)piperidine formed was filtered off and recrystallized from ethyl alcohol. The reaction yielded 15 w. of product having a melting point 194°–196° C.

*Analysis.*—Calculated for $C_{12}H_{14}N_2OCl_2$: C, 52.7; H, 5.1; Cl, 26.0%. Found: C, 52.7; H, 5.1; Cl, 25.9%.

(b) A mixture of 1-(2,6-dichlorobenzamido)piperidine (10 w.) and phosphorus pentasulfide (10 w.) was heated under reflux with toluene (100 v.) for 20 hours. The toluene solution was decanted off and evaporated to dryness giving a residue of 1-(2,6-dichlorothiobenzamido)-piperidine. This was recrystallized from petroleum spirit to give 3 w. of product having a melting point of 175°–177° C.

*Analysis.*—Calculated for $C_{12}H_{14}N_2SCl_2$: C, 49.8; H, 4.8; S, 11.1; Cl, 24.6%. Found: C, 49.8; H, 5.0; S, 11.2; Cl, 24.5%.

Example IV.—Preparation of S-methyl-2,6-dichloro-N-dimethylaminothiobenzimidate hydroiodide

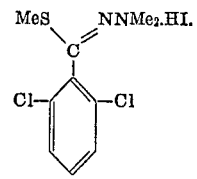

1-(2,6-dichlorothiobenzoyl) - 2,2-dimethylhydrazine (3 w.), methyl iodide (5 v.) and acetone (10 v.) were left at room temperature for 24 hours. The pale yellow crystals (2.8 w.), M.P. 159°–160° C., were filtered off and air-dried.

*Analysis.*—Calculated for $C_{10}H_{13}N_2SCl_2I$: C, 30.7; H, 3.3; Cl, 18.2; I, 32.5%. Found: C, 30.9; H, 3.4; Cl, 17.9; I, 32.1%.

Example V.—Preparation of S-methyl-2,6-dichloro-N-dimethylaminothiobenzimidate

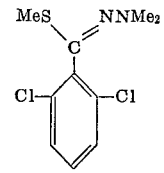

S-methyl - 2,6 - dichloro - N - dimethylaminothiobenzimidate hydriodide (2.8 w.), chloroform (50 v.) and 3 N potassium hydroxide solution were shaken together for 5 minutes. The chloroform layer was separated off, dried (MgSO₄) and evaporated giving white crystals (1.2 w.), M.P. 89°–91° C.

*Analysis.*—Calculated for $C_{10}H_{12}N_2SCl_2$: C, 45.6; H. 4.6; Cl, 27.0%. Found: C, 45.5; H, 4.5; Cl, 27.0%.

Example VI.—Preparation of a wettable powder

A wettable powder was prepared by blending, hammer-milling and subsequently air-milling the following ingredients:

| Component: | Composition, percent w. |
|---|---|
| 1-(2,6-dichlorothiobenzoyl)-2,2-dimethylhydrazine | 50 |
| Tamol 731 | 3 |
| Empicol LZ | 2 |
| Clay GTY | 45 |

(where Tamol 731 and Empicol LZ are surface active agents based on polymethylmethacrylate and sodium lauryl sulfate respectively and Clay GTY is a kaolinite china clay filler).

Example VII.—Herbicidal activity

The compounds of the invention are essentially pre-emergence herbicides and their degree of activity was determined by the following method. Seeds of oat (O), ryegrass (RG), sweet corn (SC), pea (P), sugar beet (SB), linseed (L) and mustard (M) were sown and allowed to germinate in sterile John Innes compost. The soil was sprayed at a volume equivalent to 63 gal./ac. with the following composition:

| | |
|---|---|
| Acetone _____ percent by volume__ | 40 |
| Water _____ do____ | 60 |
| Surface active agent (Triton X–155) percent by weight__ | 0.5 |
| Active ingredient _____ | Varying amounts |

(Triton X–155 is a commercially-available surface active agent and comprises an alkyl aryl polyether alcohol). Control tests were also carried out.

After ten days the phytotoxic effect of the compound applied was assessed by determining the reduction in fresh weight of stem and leaf of the emerging plant over the control plants and plotting a regression curve relating the growth inhibition (GI) and the dosage of compound applied. The dosage required for 50% and 90% growth inhibition (i.e. that weight of compound required to give a reduction in the fresh weight of plant leaf and stem of 50% and 90% respectively) is given in the following table in lb./acre.

TABLE

| Structure | GI level, percent | Growth Inhibition Dose in lb./ac. |
|---|---|---|
| | | Pre-emergence (seeds) |
| | | Soil spray |

Structure: 2,6-dichlorophenyl-C(=S)-NHR

| R | GI level | SC | O | RG | P | L | M | SB |
|---|---|---|---|---|---|---|---|---|
| R=—N(CH₃)₂ | 50 | 1.4 | <1 | <1 | <1 | <1 | <1 | <1 |
| | 90 | 3.4 | <1 | <1 | 1.9 | 1.3 | <1 | <1 |
| R=—N(CH₃)₂·HCl | 50 | <1 | <1 | <1 | <1 | <1 | <1 | <1 |
| | 90 | 2.2 | <1 | <1 | <1 | <1 | <1 | <1 |
| R=—N(CH₃)₂·HBr | 50 | <1 | <1 | <1 | <1 | <1 | <1 | <1 |
| | 90 | 1.6 | <1 | <1 | 1.3 | 1.3 | 1.5 | <1 |
| R=—N(CH₃)₂·MeI | 50 | 1.8 | <1 | 1.3 | 2.2 | 4.1 | 9.4 | <1 |
| | 90 | 4.6 | <1 | 1.8 | X | 8.5 | X | 6.1 |
| R=—N(C₄H₉(n))(CH₃) | 50 | 1.5 | <1 | <1 | 1.1 | <1 | <1 | <1 |
| | 90 | 4.2 | <1 | <1 | 3.6 | 1.2 | 1.3 | <1 |
| R=—N(piperidine) | 50 | <1 | <1 | <1 | <1 | 7.0 | <1 | <1 |
| | 90 | X | <1 | <1 | <1 | X | <1 | <1 |
| R=—N(piperidine)·HBr | 50 | <1 | <1 | <1 | <1 | <1 | <1 | <1 |
| | 90 | 2.1 | <1 | <1 | 1.1 | 1.2 | 1.1 | <1 |
| R=—N(piperidine)·HCl | 50 | <1 | <1 | <1 | <1 | <1 | <1 | <1 |
| | 90 | 2.6 | <1 | <1 | 1.4 | <1 | <1 | <1 |
| R=—N(piperidine)·MeI | 50 | 5.1 | 1.4 | X | 6.2 | X | X | X |
| | 90 | 8.9 | 6.4 | ----- | X | ----- | ----- | ----- |
| R=N(pyrrolidine) | 50 | 1.3 | <0.5 | <0.5 | 1.9 | 0.5 | 1.4 | <0.5 |
| | 90 | 1.8 | <0.5 | <0.5 | X | 0.8 | 2.1 | <0.5 |
| R=—N(morpholine) | 50 | 1.4 | <0.5 | <0.5 | 3.2 | 0.9 | 1.0 | <0.5 |
| | 90 | 2.1 | <0.5 | <0.5 | 7.5 | 1.8 | 2.0 | <0.5 |
| R=—N(piperazine) | 50 | 3.2 | <0.5 | <0.5 | 0.6 | <0.5 | 0.8 | <0.5 |
| | 90 | X | <0.5 | <0.5 | X | 0.7 | 1.3 | <0.5 |
| R=—N(piperazine)·HCl | 50 | <0.5 | <0.5 | <0.5 | 2.6 | <0.5 | 1.0 | <0.5 |
| | 90 | 4.7 | <0.5 | <0.5 | X | 3.4 | 2.2 | <0.5 |
| R=—HN(N-CH₃-piperazine)·HCl | 50 | 3.4 | <0.5 | <0.5 | 8.5 | 3.6 | 5.0 | 0.5 |
| | 90 | X | <0.5 | 0.6 | X | 7.2 | 9.7 | 2.2 |

We claim as our invention:
1. The 2,6-dihalobenzothiohydrazide of the formula

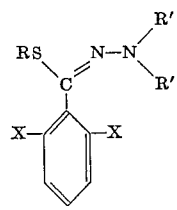

and when R is hydrogen the tautomeric form

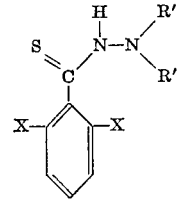

wherein each X is halogen; R is hydrogen or alkyl of 1–4 carbon atoms and R' is
a monovalent radical selected from
   hydrogen,
   alkyl of 1–4 carbon atoms,
   cycloalkyl of 5–6 carbon atoms or
   aryl of 6–10 carbon atoms
with the proviso that on one nitrogen atom both R's together may form a heterocyclic system selected from piperidine, pyrrolidine, morpholine, 4-methyl piperazine; or the N-methyl quaternary ammonium derivative of piperidine, or a mineral acid salt thereof.

2. The compound II of claim 1 wherein each X is chlorine and each R' is alkyl of 1–4 carbon atoms.

3. The compound of claim 2 wherein each R' is methyl.

No references cited.

HENRY R. JILES, *Primary Examiner.*

H. I. MOATZ, *Assistant Examiner.*

U.S. Cl. X.R.

260—293.4, 247.1, 268, 239, 326.83, 566, 326.84; 71—92, 94, 95, 88, 100